Figure 1:
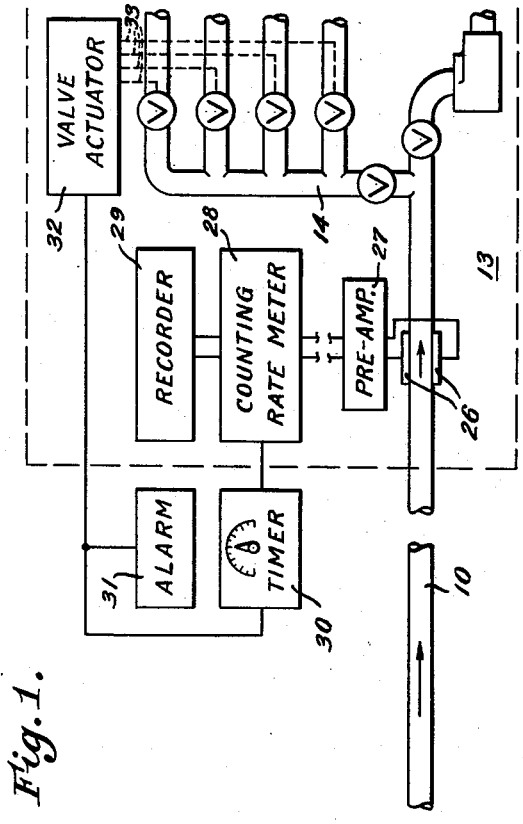

Sept. 22, 1959     W. C. PEACOCK     2,905,822

OPERATION OF PIPELINES

Filed Nov. 16, 1955

Inventor,
Wendell C. Peacock,
by   *Spencer E. Olsen*
           Atty.

United States Patent Office 2,905,822
Patented Sept. 22, 1959

2,905,822

OPERATION OF PIPELINES

Wendell C. Peacock, Dover, Mass., assignor to Tracerlab, Inc., Boston, Mass., a corporation of Massachusetts Application November 16, 1955, Serial No. 547,100

1 Claim. (Cl. 250—43.5)

This invention relates to the operation of pipelines employed to transport fluid substances, and more particularly to a method and the apparatus for determining the position of an interface between successive adjacent quantities of different materials being transported through the line.

It is common practice to transport oil and petroleum products of different grades or types in sequence through a single pipeline, often of several hundred miles in length, with various stations located along its length where products may be diverted from the line. At the diversion or take-off point, it is important to distinguish the boundary between adjacent products so that upon arrival at a take-off point or at a terminal the various different products may be directed and segregated in their respective tanks with a minimum of contamination from other adjacent products. The problem is particularly difficult in longer pipelines where flow conditions cause intermixing of the products at the interface to an unknown degree. In cases where some contamination is allowable, it is important to know the extent that intermixing has occurred so that the cut can be made at the proper point to produce the maximum amount of usable product and the least amount of product that must be downgraded or reworked.

Formerly two methods have commonly been used for this purpose; the measure of density change by a gravitometer and observation of color change by a colorimeter. Neither method would work in all cases, and both entail either the withdrawal of samples from the products flowing through the pipeline or the by-passing of a portion of the streams of products to instruments for detecting changes therein. With each method a delay was encountered between the time of change and the time when the change was detected, and during the delay it was possible for the region under study to have passed sufficiently beyond the diversion point to make it difficult or impossible to "cut" the flow at the optimum time.

More recently, radioactive tracer techniques have been employed to mark the interface between adjacent products and to give an indication of the degree of intermixing at the interface, this method being generally described in Metcalf Patent No. 2,631,242, dated March 10, 1953 and more specifically described in Mithoff et al. Patent No. 2,706,254, issued April 12, 1955. The technique, as described in these patents involves the injection of a radioactive tracer into the pipeline at the interface between two substances which have been placed therein in sequential adjacent relationship. A tracer material is employed which has physical characteristics so as to intermingle readily with the substances in the pipeline and to be carried in the interface and distributed throughout the region thereof as the interface merges into the adjacent substances in substantially the manner in which adjacent substances intermix due to conditions of flow. The tracer is preferably a gamma-emitter to permit detection of radiations therefrom outside the pipe, and appropriate instruments are provided at the diversion stations for detecting the tracer material, and for measuring the amount of radioactivity of different portions of the region of intermixing to determine therefrom the degree of intermixing that has occurred. The Mithoff et al. patent discloses that when it is necessary to make only a heart cut, the operator need know only when the interface region preceding the product has passed the diversion station so that the cut can be taken from the uncontaminated portion of the product. A single detector station located at the diversion station will suffice for this purpose, but obviously it cannot be used to make a cut, with any degree of accuracy, at the beginning or at any intermediate point in the region of intermixing. To accomplish the latter, which requires that the operator be informed of the imminent arrival at his station of the interface, Mithoff et al. employ two detector stations, a principal detector station at the diversion point and an auxiliary detector station at a position upstream of the diversion point a distance at least as great as the length of the intermixed region between adjacent products. The instruments at the auxiliary station indicate and record the variations in radioactivity in the pipeline products passing that point, and this information is transmitted over a telephone or radio link to the principal station where it is recorded. With this advance information, the operator at the diversion point is able to prepare for the arrival of the interface, and has information on the degree of intermixing such that when the tracer is picked up at the principal station (and recorded on a second recorder) he is prepared to make the optimum cut of the products.

The patented methods have met with some success, but have objectionable features, particularly the need for two complete detector stations in order to make a cut other than a heart cut. Radiation detectors and recorders are expensive, and telemetering links suitable for transmission of information relative to variations in radioactivity are relatively complex, and consequently expensive, and subject to failure. Moreover, the general method suffers from the inability of the operator at the sending end to inject the tracer material into the pipeline at the proper instant so as to be absolutely certain that it is at the interface between adjacent products. Accordingly, in spite of accurate measurement of the variations in radioactivity in the region of the interface, and the making of a cut on the basis of these variations in radioactivity, the cut is necessarily in error by the amount by which the tracer missed the interface at the point of injection.

With an appreciation of the foregoing defects and shortcomings of prior art methods of interface location, applicant has as a general object of the present invention to provide an improved method for locating an interface between sequential fluid products in a common pipeline.

Another object of the present invention is to provide a radioactive tracer method for determining the degree of intermixing of adjacent products at an interface which does not depend for its accuracy on the injection of the tracer material exactly at the interface.

Still another object of the invention is to provide a method for automatically diverting as desired adjacent products from a pipeline which requires the use of a single detector station at the diversion point, thus to reduce the cost of operation of the pipeline.

To accomplish these objects, and other objects which are obvious, or will become apparent as the description proceeds, the invention comprises the use of a radioactive tracer material which is injected into the pipeline at a convenient time ahead of the interface between two sequentially adjacent products. Simultaneously with the making of the injection a timer or flowmeter is started, to be stopped exactly when the product change is made, thus giving the operator at the sending end data on the exact time interval, or volume of oil, if a flowmeter is used, between the tracer injection and the center of the interface. Inasmuch as a contemplated product change is known well in advance, the time of injection can be ascertained so as to be ahead of the interface at least by the time it takes the region of intermixing to pass a diversion station on the pipeline. The originating operator then sends this information, for example, by regular telephone service, to the operator of the receiving or diversion station. A tracer material is employed which will have the proper characteristics to intermingle readily with the product into which it is injected and to be distributed in said product in substantially the manner in which adjacent products intermix due to conditions of flow. Appropriate instruments are provided at the diversion station for detecting the radioactivity of the tracer material, and for measuring the variations in radioactivity in the region of intermingling to determine therefrom the degree of intermixing at the interface. The radiations from the radioactive tracer are used to start either a timer or a flow device arranged to actuate an alarm or valves after either a pre-set time interval, as advised by the originating operator, or a pre-set volume of liquid, has passed. With this arrangement, a cut is made at the leading edge of the intermixed region of the interface, with the first to arrive product uncontaminated, and the contaminated interface diverted with the following product. Alternatively, the tracer detection system may be arranged to start the timer at a predetermined radiation level on either slope of the radioactivity distribution curve, or at the peak of the curve, so as to make the cut at any desired point in the interface region. In either event, only a single detection system is required, and the entire curve of variations of distribution of the radioactive material can be examined, at the diversion station, before the cut is actually made.

Figure 2:
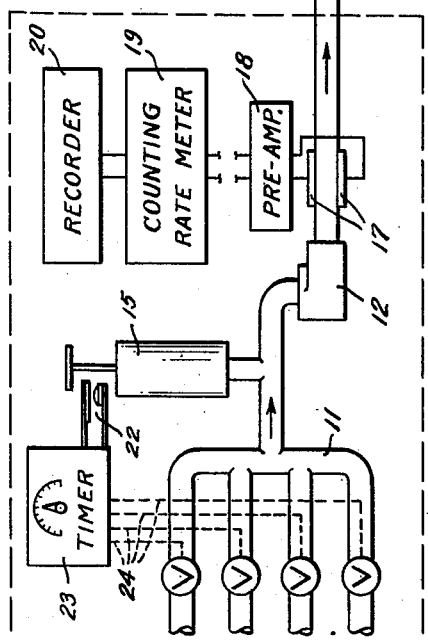
Figure 2:
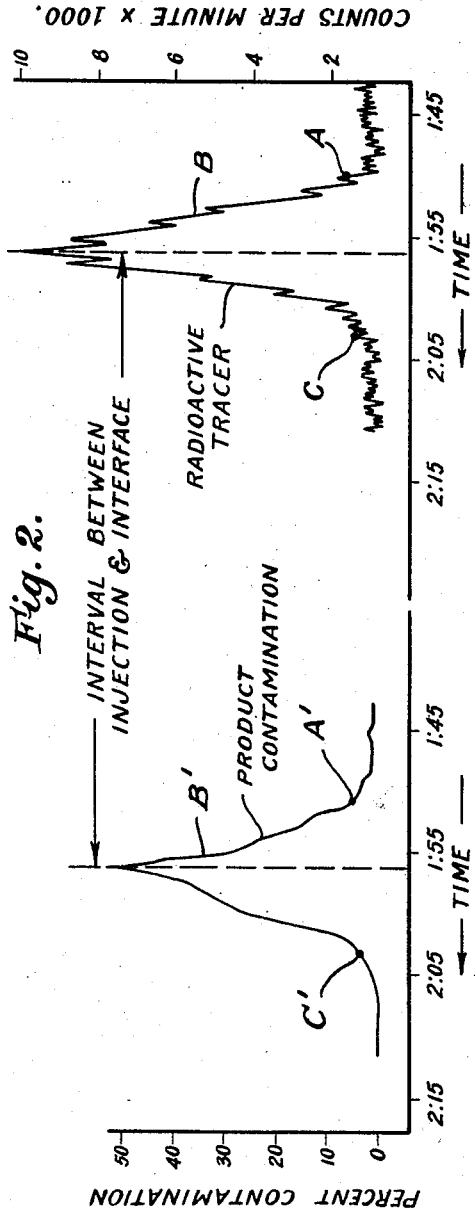

The novel features which are believed to be characteristic of the invention are set forth with particularity in the appended claims. The invention itself, however, both as to its organization and method of operation, together with further features and advantages thereof, may best be understood by reference to the following description taken in connection with the accompanying drawings in which:

Fig. 1 is a diagrammatic representation of a petroleum products pipeline together with the apparatus employed in this invention; and Fig. 2 illustrates in graph form, on a condensed time scale, a comparison between the distribution of the radioactive tracer in the product in which it is injected and the relationship of intermixing of the products at the interface.

Fig. 1 illustrates the invention as applied to a petroleum products pipeline 10 which is adapted to receive in succession various quantities of different petroleum products from their respective storage tanks through a manifold 11. A pump 12 receives the products from the manifold on its suction side and discharges the products from its compression side and into the line 10. The pipeline may extend a distance of several hundred miles and may have diversion stations along its length, a representative one of which is represented by numeral 13, where provision is made for segregating different products through a manifold 14 to appropriate tanks.

The tracer may be injected into the pipeline at any convenient point, one such point being between the suction side of pump 12 and manifold 11 through which the products are introduced into the line. Numeral 15 represents an injector located in such a position and capable of rapidly injecting the tracer material into the system. The injector 15 may take a variety of forms, a particularly suitable design being disclosed in application S.N. 311,174, now Patent No. 2,752,067, of Jerome Kohl and Richard Newacheck entitled "Injector," filed September 24, 1952 and assigned to Tracerlab, Inc. Briefly, the injector therein disclosed comprises a chamber in which a cartridge containing a radioactive solution and a flushing solution is removably placed, the two solutions being separated in the cartridge by a puncturable floating piston. One end of the cartridge is closed by a puncturable diaphragm and the other end is closed by a movable piston. A compressed gas cartridge is provided, which upon puncturing exerts pressure behind the latter piston causing the entire cartridge to be driven on to a sharpened tube which ruptures the diaphragm and allows the radioactive solution to be discharged through the tube and into the pipeline. Continuation of the pressure drives the movable piston and floating piston into the cartridge until the floating piston is also punctured by the tube to release the flushing solution, which cleans all radioactive material from the cartridge and carries it into the pipeline. Emptying of the cartridge takes place in a matter of a second thereby insuring that the radioactive solution is not distributed over any sizeable volume of oil.

This method of injection is virtually foolproof, but as a check on the injection and to obtain a permanent record of the time of injections, a detector station may be positioned on the pipeline just downstream from pump 12. The detector station comprises a plurality of Geiger tubes 17 mounted on the pipe and connected to a pre-amplifier 18, a counting rate meter 19 and a recorder 20. The counting rate meter gives an instantaneous indication of the variations in radioactivity passing the tubes 17, and the recorder makes a permanent record of the variations over a selected time interval.

The tracer material used in the practice of the invention is preferably a gamma emitter, to permit detection from the outside of the pipe, should be a stable compound which readily intermixes with the products in the pipeline, and the radioisotope employed should have a half-life comparable with the duration of its time of travel through the pipeline. One suitable isotope is barium-140, a fission product of an atomic pile, which may be converted to an oil-soluble compound. Another isotope suitable for this purpose is antimony-124, a suitable compound being triphenylstilbene. This radioactive compound can be dissolved in an oil carrier to make a fluid tracer material which intermixes readily with the products carried in the pipe line.

In accordance with this invention, injector 15 is operated to inject the tracer material into the pipeline at a convenient time ahead of the time a product change is to be made. A contemplated product change is planned sufficiently in advance so that it is a simple matter to make an injection ahead of the interface, particularly when the interval between the injection and the interface need not be exact. The time interval with which the injection precedes the product change will depend to a large extent on the length of the pipe line, as it is desirable that the injection be ahead of the interface at least by the time it takes the region of intermixing of the tracer material and product to pass a detection station at a diversion or terminal station on the pipeline. On short lines, a suitable interval may be ten minutes, or so, while on a line of a length of say 600 miles, an interval of one and one-half hours would be satisfactory. Simultaneously with the operation of injector 15, the actuating mechanism thereof may be employed to close a switch 22, for example, to start a timer 23. When the product change is made, by closing of one and the opening of another of the valves connected to manifold 11, the timer 23 is stopped just as the change is completed, by mechanical means indicated by dotted line 24, or by suitable electrical means actuable by the valves. The timer, then, gives the elapsed time between the time the injection was made and the time the product change was made.

The originating operator sends this information, i.e., the time interval, to the diversion station, by regular telephone service for example, or if desired, by a telemetering link.

In pipelines that are operated on a volume batch basis rather than on a time basis, the timer is replaced with a flow meter which is put in operation simultaneously with the injection and stopped at the time the product change is made. In this case, information as to the volume of oil between the injection and the interface is obtained, which information is sent ahead to the operator of the diversion or receiving station.

As the tracer material is being carried through the pipeline it intermingles readily with the product into which it was injected such that at the terminus there is a variation in distribution of the radioactive material. This distribution is determined at the diversion station by a detector staton, which consists of a plurality of Geiger tubes 26 mounted adjacent the pipeline and connected to a pre-amplifier 27, a counting rate meter 28, and a recording instrument 29. As the radioactive tracer passes the detector station, ahead of the interface, the instrument 29 will record its passage and also the variation in radioactivity in the intermingled region.

The right hand portion of Fig. 2 illustrates in graphic form the radioactive tracer record obtained on a 10-inch products pipeline 70 miles in length. It will be noted that the first indication of the approach of the radioactive tracer was detected at approximately 1:47 on the illustrated time scale, and that the activity increased to a maximum at about 1:56 and then fell back to background at about 2:05, showing that approximately 18 minutes were required for the intermingled region to pass the detector station.

By the use of gravitometer methods to determine the gravity of the leading and following products at the interface, a blend chart can be used to obtain the percent of mixing of the products at various sampling points throughout the region of the interface. From such data a curve can be drawn showing the percent contamination of one product by the other in this region. Such a curve derived from data obtained from an interface wherein one of the products was that into which the tracer material was injected is shown in the left-hand portion of Fig. 2 on the same time scale as the radioactivity distribution curve. This curve, of course, is separated in time (or volume) from the tracer distribution curve by the interval between the injection of tracer and the product change at the sending end of the line. In other words, the entire radioactivity distribution curve is recorded at the diversion station before the intermixed region of the interface reaches the diversion station. It will be noted that the variations in the distribution of the radioactive material in the leading product very closely approximates the variations of intermixing of adjacent products at the interface.

Advantage is taken of this fact in the practice of the present method to cut into the interface region at the optimum time to hold the products at a desired purity. A timer 30 located at the diversion point is preset to the interval obtained from the originating operator. If, for example, it is desired that the first to arrive product is to be free from contamination, the timer 30 may be arranged to be actuated by the output signal from the counting rate meter 28 when it first reaches a significant level above background, such as a magnitude A (Fig. 2). After the preset time has elapsed, the timer 30 is arranged to sound an alarm 31 to inform the operator that the values are to be operated to make the cut, or to operate a valve actuator 32 which automatically opens and closes the correct valves on manifold 14, as indicated by dotted lines 33. In this case the cut would be made at approximately point A' on the blend chart. If 40% contamination of the leading product with the following product represents a tolerable intermixing, the timer 30 would be adjusted to start when the output signal from the ratemeter 28 reaches the amplitude indicated at point B. Likewise any other point can be selected on the tracer distribution curve at which to actuate the timer, and of course, the operator alternatively may observe the recorded curve on recorder 29 and manually start the timer at any desired point on the curve. Manual actuation of the timer may be preferable when it is desired to dump the intermixed region with the leading product, for the operator can observe the passage of the tracer material and start the timer say, at point C, in which case, after the preset interval has elapsed, the cut is made at $C^1$.

It will be understood, of course, that on a pipeline operated on a volume batch basis where a flow meter instead of a timer is employed at the sending end, the timer 30 will be replaced by a flowmeter to measure a preset volume of fluid product between the arrival of tracer material a given intensity and a corresponding point on the product contamination distribution at the interface.

It is apparent that the radioactive tracer method described herein provides more economical operation of pipelines than afforded by heretofore known methods, particularly in that about half as much detection equipment is required, and more accurate operation because the problem of injecting the tracer exactly at the interface, not normally achieved in practice, is eliminated.

Although the invention has been described as applied to a petroleum products pipeline, it is apparent that it can be applied to conduits carrying other materials, and it is intended that the invention embrace all applications and modifications within the limits of the appended claim.

What is claimed is:

The method of operating a pipeline through which is transported different fluid products in sequential adjacent relationship to divert therefrom at a station on said pipeline preselected products, comprising injecting a radioactive material solely into the leading one of said sequentially adjacent products before it is transported, said radioactive material having a diffusion characteristic in said leading product comparable to the distribution and intermingling of adjacent products, measuring the interval between the injection of said radioactive material and the placing within said pipeline of the following sequentially adjacent product, transporting said products through said pipeline, placing a single detector for radioactivity in proximity to said pipeline at said diversion station, starting interval measuring means at said station in response to a predetermined amplitude of the waveform of variations of radioactivity of said radioactive material as detected by said detector, and diverting said products from said pipeline when said interval measuring means indicates the elapse of a preset interval equal to the interval between the injection of said radioactive material and the placing in the pipeline of said following sequentially adjacent product, said time interval being of sufficient length in relation to the time of transport through said pipeline from the point of injection to said diversion station whereby said radioactive material remains substantially wholly within said leading one of said sequential products notwithstanding said diffusion thereof.

References Cited in the file of this patent
UNITED STATES PATENTS 2,706,254    Mithoff _____ Apr. 12, 1955

OTHER REFERENCES

Hull: Using Tracers in Refinery Control, Nucleonics, April 1955, Peaceful Uses of Atomic Energy, volume 15, pages 202 and 203.